United States Patent [19]

Birchall et al.

[11] 4,155,772

[45] May 22, 1979

[54] SILICEOUS MATERIALS

[75] Inventors: James D. Birchall; Roger M. Pybus, both of Runcorn, England

[73] Assignee: Imperial Chemical Industries Limited, London, United Kingdom

[21] Appl. No.: 803,231

[22] Filed: Jun. 3, 1977

[30] Foreign Application Priority Data

Jun. 4, 1976 [GB] United Kingdom ............... 23156/76

[51] Int. Cl.$^2$ .......................... C09C 1/44; C09C 1/28
[52] U.S. Cl. .................. 106/307; 106/308 Q; 106/309; 428/404; 427/220
[58] Field of Search ............... 106/288 B, 307, 308 Q; 428/404; 427/220

[56] References Cited

U.S. PATENT DOCUMENTS

| | | | |
|---|---|---|---|
| 2,866,716 | 12/1958 | Broge | 106/308 Q |
| 3,188,225 | 6/1965 | Walker | 106/307 |
| 3,962,067 | 6/1976 | Blount | 106/288 B |
| 3,962,111 | 6/1976 | Blount | 106/288 B |

*Primary Examiner*—Patrick Garvin
*Assistant Examiner*—J. V. Howard
*Attorney, Agent, or Firm*—Cushman, Darby & Cushman

[57] ABSTRACT

The deposition of a carbonaceous coating on the surface of a particulate siliceous filler by catalytic thermal decomposition of an organic compound, to improve the value of the said filler in organic polymer compositions, is difficult with some varieties of siliceous fillers. This invention is based on the treatment of the initial siliceous filler with a solution of an acid to displace alkali metal ions, which are believed to inhibit the desired catalytic decomposition. The acid treatment is carried out to reduce the alkali metal ions (especially sodium) to an acceptably low level, preferably below about 500 ppm. The treatment is especially applicable to precipitated silica fillers.

11 Claims, No Drawings

SILICEOUS MATERIALS

This invention relates to siliceous materials, and more particularly to siliceous materials useful as fillers in organic polymers and to methods for making them.

It is known to make siliceous fillers which comprise mainly silica by precipitation from aqueous solutions of sodium silicate, for example by acidification. These are sodium silicate, for example by acidification. These are sometimes referred to as "precipitated silicas". Such materials usually serve as inert "diluent" fillers, and contribute little or nothing of value to the physical properties of the polymer compositions in which they are incorporated.

In our co-pending U.S. application Ser. No. 762,153 filed Jan. 24, 1977, we describe improved siliceous fillers comprising siliceous particles having on their surface an adherent carbonaceous coating, and a method for making them which comprises contacting siliceous particles with an organic compound under conditions which cause deposition of carbonaceous material on the silica by catalytic decomposition or "cracking" of the organic compound.

We have now found that the common siliceous fillers usually contain residual alkali metal ions and can be rendered more useful by a treatment which removes the alkali metal ions from them. This procedure removes alkali metal cations which cannot be removed by washing with water alone.

It is believed (though this is by way of explanation and is not intended as any limitation on the scope of our invention) that the unsuitability of some siliceous fillers for treatment by the process of our application Ser. No. 762,153 filed Jan. 24, 1977, is caused by the presence of alkali metal ions, which suppress the catalytic cracking of the organic compounds on the surface of the siliceous material to form the desired carbonaceous coating. We have now found that removal of the alkali metal ions increases the ability of the siliceous material to promote the catalytic cracking.

It is similarly believed that the alkali metal ions in the known precipitated silica fillers are held in the structure of the siliceous material and serve to provide the proportion of cations necessary to neutralise its acidity, and that treatment of the siliceous material with an acid displaces the alkali metal ions and replaces them by hydrogen cations. On this basis, the treated product may be regarded as a "free acid" or protonated form of the siliceous material.

Thus according to our invention we provide a process for the manufacture of a siliceous filler which comprises contacting siliceous particles with an organic compound at elevated temperature under conditions which cause deposition of carbonaceous material thereon by catalytic decomposition or "cracking" of the organic compound, characterised in that the siliceous particles used have first been treated with a solution of an acid so as to displace alkali metal ions therefrom.

We also provide novel compositions comprising an organic polymer and a filler as defined above.

For use in the step of depositing the adherent carbonaceous coating on the siliceous particles, the siliceous particles which have been treated with the acid are preferably first dried and ground sufficiently to break up aggregates of particles before being subjected to the "cracking" process. For this, the presence of any residual acid or salts (other than alkali metal salts) is not harmful as these are usually decomposed or volatilised under the conditions of the "cracking" process; accordingly, thorough washing to remove all surplus treatment acid is not very important provided that the alkali metal salts are separated sufficiently well in the surplus treatment solution which is first removed or in any preliminary washing which may be given before drying.

Especially, we can use for the process of our invention siliceous particles which contains less than 500 ppm of alkali metal ions and also a proportion of hydrogen cations.

The conditions used for the deposition of the carbonaceous coating may be those more fully described in U.S. application Ser. No. 762,153, filed Jan. 24, 1977.

Especially the coating of the siliceous particles may be achieved by contacting them with the organic compound at a catalytic cracking temperature, usually between 250° C. and 1000° C. and especially between 250° C. and 600° C. This is most conveniently done in a substantially non-oxidising atmosphere which may be achieved by using the vapour of the organic compound alone or by diluting the vapour with an inert diluent gas or vapour, for example nitrogen. It is not essential, however, that oxidising conditions be entirely avoided, provided that the principal reaction of catalytic decomposition to form the carbonaceous coating can take place.

The siliceous particles may be heated and contacted with the organic compound by known techniques, of which the preferred one is to make the siliceous particles into an agitated bed (for example a fluidised bed) at the desired temperature and to pass the organic compound as vapour into this bed.

The process may be carried out by introducing the organic compound into contact with the hot siliceous particles for sufficient time to build up the desired proportion of carbon on it. The proportion may be measured by standard combustion techniques, whereby the carbonaceous material is burnt and measured as carbon dioxide formed. A suitable proportion is usually that which achieves coverage of a major proportion of the surface of the siliceous particles, and, in terms of the weight proportion in relation to the silica, these proportions preferably lie in the range 1 to 30 percent by weight of the silica (measured as carbon).

The siliceous particles which may be so treated may be those products, known or proposed for use as fillers, which contain silica in free or combined form and which contain appreciable proportions of alkali metal ions which cannot be removed readily by washing with water alone. Such materials may be for example a precipitated siliceous material but especially a material made by precipitation from an alkali metal silicate solution, for example by precipitation with acid. The alkali metal present is, most commonly, sodium; the proportion of alkali metal may vary but is commonly in the range 0.1 to 5.0% by weight of the siliceous material, calculated on the dried weight of the siliceous material.

Chemically, the siliceous filler should be of such a composition that it is acidic. Absolutely pure silica is not acidic and so is not suitable, and it is necessary that the silica is rendered acidic by incorporation within its structure of another metal oxide or oxides (for example aluminum oxide). Other metal oxides which may thus impart acidity may be present wholly or partly in combination, and the exact form in which they are present may be difficult to determine. Nevertheless, the desired acidity (sometimes described as Bronsted acidity) can be detected by determination of the amount of alkali metal which is held to neutralise this acidity, as distinct from the amount of alkali metal present as soluble salts which can be washed out. One simple technique comprises taking a sample of the siliceous material and treating it with aqueous acid and then thoroughly washing it with water and drying it, and then placing the dry sample on moist pH indicator paper; if the siliceous material is an "acid" one, it will turn the indicator paper to a colour indicating this. The degree of acidity may be estimated by examining the reduction in pH of a pH 7.00 aqueous solution of ammonium acetate when a predetermined amount of the dry acid-treated sample is added to it.

For the purpose of this invention the degree of acidity may vary, but in general we prefer that it is not sufficiently strong to cause degradation of a polymer into which the treated filler is incorporated (as for example during the compounding or fabrication stage) and yet is sufficiently strong to promote the desired "cracking" reaction. These limits are difficult to quantify but the suitability of any particular siliceous material may be determined readily by simple trial.

The siliceous filler should have an ultimate particle size within the range 5 to 500 nm, and preferably within the range 5 to 50 nm, so as to be readily incorporated into a polymer without having too much adverse effect on the physical properties of the compound product. It is also highly desirable that the particles should have a high surface area, usually in the range 5 to 300 square meters per gram when determined by the standard BET method. We prefer that the surface area of the filler particles should be as high as practicable, and particle sizes below 10 microns are very much preferred.

The acid used may be any conveniently soluble acid, and may be organic or inorganic in nature. It is preferably a strong acid, and especially a mineral acid for example nitric acid, hydrochloric acid or sulphuric acid. Weaker acids may be used if desired, however, for example formic acid, acetic acid, or mixtures of acids. The choice is determined by such factors as the cheapness and availability of the acid, the solubility of its alkali metal (especially sodium) salt, and in some cases also the volatility of the acid so that any excess may readily be removed by volatilisation in a subsequent drying step.

The acid may be used as a solution in any convenient solvent which will dissolve it and permit the desired displacement of alkali metal ions. Water is the most suitable solvent, as it is cheap, safe and efficient, but alternative solvents may be used if desired, for example a polar solvent or a mixture of such a solvent with water.

Thus, for example, the treatment may be carried out using aqueous solutions of hydrochloric, nitric or sulphuric acids or mixtures thereof.

The concentration of the acid may be varied considerably, according to such factors as the solubility of the salt and the amount of alkali metal to be displaced, but concentrations in the range 0.1 to 10% by weight of the solution are usually suitable though concentrations outside these limits may be used if desired.

The proportion of the acid to the siliceous material may also be varied, having regard for similar factors. Theoretically it is necessary to use at least 1 equivalent proportion of acid for each equivalent of the alkali metal to be displaced from the siliceous material, but in practice it is usually necessary to use appreciably more, for example 5 to 20 equivalent proportions for each equivalent of alkali metal present in the siliceous material to be treated, though larger or smaller proportions may be used.

The treatment may be carried out in one or more stages, and in a batchwise or continuous manner (or combination of these) as desired. Thus it may be convenient to mix the siliceous material with the solution of the acid (for example with stirring) and then to allow sufficient time for displacement of the alkali metal ions to take place before separating the siliceous material from the solution, for example by filtration or centrifuging. In some instances, it may be sufficient to dry the siliceous material directly after separation from the treatment solution; this applies if the alkali metal removal has been efficient enough and any residual acid is not harmful to the final product or is readily removed on drying. More commonly, however, the separated siliceous material may be washed with fresh solvent (especially water) to remove surplus acid and salts. On a commercial scale, however, it is usually more convenient to employ a continuous washing procedure on a filter bed, in which the siliceous material is first wetted with water and then contacted with the acid solution (for example by percolation) and then, when sufficient alkali metal removal has occurred, the material is finally washed with water.

The optimum conditions for the treatment (for example the time of contact and the temperature of the solution) may readily be determined by simple trial and may vary widely. Treatment usually requires at least 10 minutes and contact for more than 12 hours usually produces no great additional benefit. Similarly, the treatment may be carried out at any temperature from below ambient up to the boiling point of the solution, though temperatures in the range 0° to 50° C. are usually most convenient and economic though temperatures outside this range may be used if desired.

Our products have some of the properties of the siliceous particles from which they are derived, and in addition have good compatibility with organic polymers. The modification of the siliceous surface with the carbonaceous coating imparts a valuable strengthening of the ultimate association of the filler with the polymer in which it is incorporated. The mechanism of this is not entirely clear, and may in many cases arise from physical properties associated with the carbonaceous "skin" on the silica particles. It appears, however, that the presence of reactive groups in the surface of the particles gives rise to chemical reaction with the polymer being filled, in an analogous manner to that of carbon black; this interaction between the polymer and both siliceous surface and polymer leads to improvement in the bonding and compatibility of the filler in use.

The polymer into which the products of our invention may be incorporated may be in any convenient form and incorporation may be carried out by conventional mixing means. This polymer may be any homopolymer or copolymer having physical properties permitting incorporation of our new products as fillers and is preferably one containing unsaturation and is curable (vulcanisable) rather than being merely inert and thermoplastic. Thus, for example it may be a massive or particulate plastic or rubbery material, into which our filler may be incorporated by mechanical action (for example milling) or it may be in the form of a solution or suspension (for example a latex) into which our filler may be incorporated by suitable mixing techniques and the polymer/filler combination may then be isolated by removal from the diluent or solvent liquid. Chemically, the polymer may be of widely varying constitution and may be for example any natural or synthetic rubber or resin known in the art to be usable in conjunction with a filler. The products or our invention are especially useful as fillers in natural or synthetic rubbers, for example butadiene-based rubbers, for example butadiene-styrene and butadiene-acrylonitrile rubbers.

The optimum proportion of our fillers to the polymers in which they are incorporated may be determined by simple trial. Commonly, proportions up to 50 parts per 100 parts of the polymer may be used, and even greater proportions may be used, for example in oil-extended rubbers.

The products may be used in conjunction with conventional adjuvants, for example antioxidants, plasticisers, vulcanisation accelerators, pigments, fillers and the like.

The invention is illustrated but not limited by the following Example in which the parts and percentages are by weight unless otherwise stated.

EXAMPLE 250 grams of a commercially available grade of precipitated silica filler, containing 1.0% sodium ion and 0.7% alumina calculated in the dried material, were mixed with a solution of 49 grams (0.5 ml) of sulphuric acid in 1 liter of water and the mixture was stirred mechanically for 30 minutes at 20° C. The suspension was then filtered and the wet filter cake was washed continuously with di-ionised water at 20° C. until the pH of the washings increased to a constant value of 5.5.

The wet solid was then dried at 110° C. until no further loss of weight was evident. The dried product was comminuted to a fine powder by ball-milling for 24 hours. Analysis of the dried product showed that it contained 20 ppm of sodium ion and 0.47% alumina.

The dried powder was charged into a reactor vessel, which was then purged with nitrogen and heated to 500° C. over a period of 30 minutes. Propylene was then passed into the reactor at this temperature for 1 hour. The product was a black powder containing 3.71% carbon, as determined by combustion analysis.

What we claim is:

1. In a process for the manufacture of a siliceous filler which comprises contacting a particulate siliceous filler with an organic compound at elevated temperature, whereby the organic compound is catalytically decomposed to form an adherent carbonaceous coating on the surface of the said particulate siliceous filler, the improvement which comprises first treating the siliceous filler particles which contain alkali metal ions in a quantity sufficient to impede catalytic decomposition to form the carbonaceous coating with a solution of an acid so as to displace alkali metal ions therefrom and then removing the solution so as to leave the siliceous filler particles depleted of at least a part of their alkali metal ion content.

2. Process as claimed in claim 1 wherein the treatment with the solution has reduced the alkali metal ion content of the siliceous filler particles to less than 500 parts per million, by weight.

3. Process as claimed in claim 1 wherein the alkali metal ions removed by the solution treatment are sodium ions.

4. Process as claimed in claim 1 wherein the acid used is a mineral acid.

5. Process as claimed in claim 4 wherein the acid used comprises at least one of the sulphuric acid, nitric acid and hydrochloric acid.

6. Process as claimed in claim 1 wherein the acid is sufficiently volatile for any excess to be readily removed by volatilisation in the subsequent drying step.

7. Process as claimed in claim 1 wherein the acid used to treat the siliceous filler particles is in the form of an aqueous solution.

8. Process as claimed in claim 1 wherein the acid used for treatment is used at a concentration of 0.1% to 10% by weight of the treating solution.

9. Process as claimed in claim 1 wherein the proportion of the treating acid is in the range 5 to 20 equivalents for each equivalent of alkali metal ion in the siliceous filler.

10. Modified siliceous fillers, prepared according to the process of claim 1 and useful for the production of fillers having an adherent coating of carbonaceous material, wherein a proportion of the alkali metal ion content has been displaced by hydrogen cations.

11. Process for making a modified siliceous filler having an adherent coating of carbonaceous material, which comprises treating a particulate siliceous filler with a solution of an acid so as to displace alkali metal ions therefrom, in the manner specified in claim 1.

* * * * *